United States Patent [19]
Kinney

[11] 3,938,697
[45] Feb. 17, 1976

[54] MAGAZINE FEEDER FOR CIRCULAR ELEMENTS

[75] Inventor: Alfred W. Kinney, Kansas City, Mo.

[73] Assignee: Phillips Petroleum Company, Bartlesville, Okla.

[22] Filed: Sept. 27, 1974

[21] Appl. No.: 510,129

[52] U.S. Cl. ............... 221/11; 221/106; 221/277; 53/313; 214/8.5 A; 214/7
[51] Int. Cl.² .................................................. G07F 11/12
[58] Field of Search ............ 221/9, 10, 11, 17, 103, 221/104, 106, 108, 133, 174, 195, 253, 277, 279, 289, 290; 214/7, 8, 5 A, 5 K, 5 R; 53/306, 310, 313

[56] References Cited
UNITED STATES PATENTS

| | | |
|---|---|---|
| 3,010,588 | 11/1961 | McBean et al.................. 221/104 |
| 3,332,210 | 7/1967 | Tordi.............................. 221/279 |
| 3,598,279 | 8/1971 | Duffau............................ 221/106 |
| 3,722,741 | 3/1973 | Mojden........................... 221/11 |

*Primary Examiner*—Robert B. Reeves
*Assistant Examiner*—H. Grant Skaggs, Jr.

[57] ABSTRACT

Generally circular articles within a row of similar articles are conveyed and dispensed from the end of the row. When the row of articles is substantially depleted a magazine containing another row of the articles is advanced to bring the additional row of articles in contact with the conveying shaft. A method and apparatus are provided for automatically actuating and advancing the magazine and for returning it to its original position when all articles contained therein have been delivered to the conveyor.

17 Claims, 6 Drawing Figures

MAGAZINE FEEDER FOR CIRCULAR ELEMENTS

This invention relates to a method and apparatus for dispensing a plurality of generally circular articles. In another aspect it relates to a method and apparatus for delivering successive rows of generally circular articles to an apparatus which dispenses the thus delivered articles. In still another aspect this invention relates to a method and apparatus for automatically delivering successive rows of generally circular articles to an appratus which dispenses the thus delivered articles. In yet another aspect this invention relates to a method and apparatus for dispensing covers or lids for containers.

Various manufacturing or production operations, particularly packaging operations, require that a continuing and uninterrupted supply of various articles be provided at a specific location for use in assembling, constructing, or otherwise incorporating them into an article or package which is being made. In the packaging of foods or other products in particular, when a product is dispensed into a container and various operations including capping are thereafter performed upon the container, the operator of the filling machine must be certain that an uninterrupted supply of containers, covers, and other packaging materials are provided to the packaging apparatus. The necessity of having an uninterrupted supply of such materials is particularly important in the large number of packaging processes in which the supply of material or product to be packaged cannot be stopped and must either be packaged or wasted and also in a large number of processes in which the time, lost production, and energy expended in halting a packaging machine in order to reestablish a supply of depleted packaging materials is substantial.

It is very desirable, therefore, to have a method and apparatus of supplying articles to a process or operation in such a way as to minimize the possibility of their supply being interrupted. One solution to the problem is to provide a sufficient number of operators and assistants to permit all supplies of such articles to be checked and refilled frequently. When an operator or an assistant has several machines to monitor or several operations on a single machine which divide his attention, however, the frequency with which his attention must be directed to any given aspect of the machine's operation or to any particular machine within a group substantially increases the probability of his being required to attend to more than one task at almost the same time and will often determine how hectic or nerve-wracking the operation of equipment will be.

It is therefore an object of this invention to provide a method and apparatus for delivering generally circular articles. An additional object of the invention is to provide a method and apparatus for increasing the capacity of apparatus delivering generally circular articles. Still another object of the invention is to provide a method and apparatus which permits efficient resupply of articles to a dispensing apparatus. Yet another object of the invention is to provide a method and apparatus for dispensing container covers. An additional object of the invention is to provide a method and apparatus for supplying container covers to a packaging apparatus. Still another object of the invention is to provide a method and apparatus for supplying generally circular articles to the conveying portion of an apparatus which serially dispenses the articles.

In accordance with the present invention a rotating shaft means within a conveying chute conveys a row of generally circular articles resting thereon to a first end of the shaft means where the articles are dispensed one at a time into a chute or other suitable receiving means. An intermittently actuated magazine feeder means is adapted to deliver a row of articles into contact with the rotating shaft means. The magazine feeder means is equipped with at least one magazine compartment with each compartment being capable of carrying a sufficient number of articles to replenish the supply of articles in contact with the rotating shaft means and available for delivery to the first end thereof. The rotating shaft means which conveys the articles to a delivery point and maintains the articles in a row within the conveying trough for the apparatus of the invention insures the uninterrupted delivery of articles from the conveying trough. The magazine feeder means insures an uninterrupted delivery of articles to the conveying trough while increasing the length of time which the apparatus can continue in operation without the attention of an operator in refilling its supply of articles by a factor at least equal to the number of magazine compartments within the magazine feeder means. Although the method and apparatus of the invention are particularly well suited for the supply of container covers to a packaging machine, the invention is equally applicable to a large number of other specific operations.

Additional objects and advantages of the invention will be apparent from the description of the drawings in which.

Figure 1:
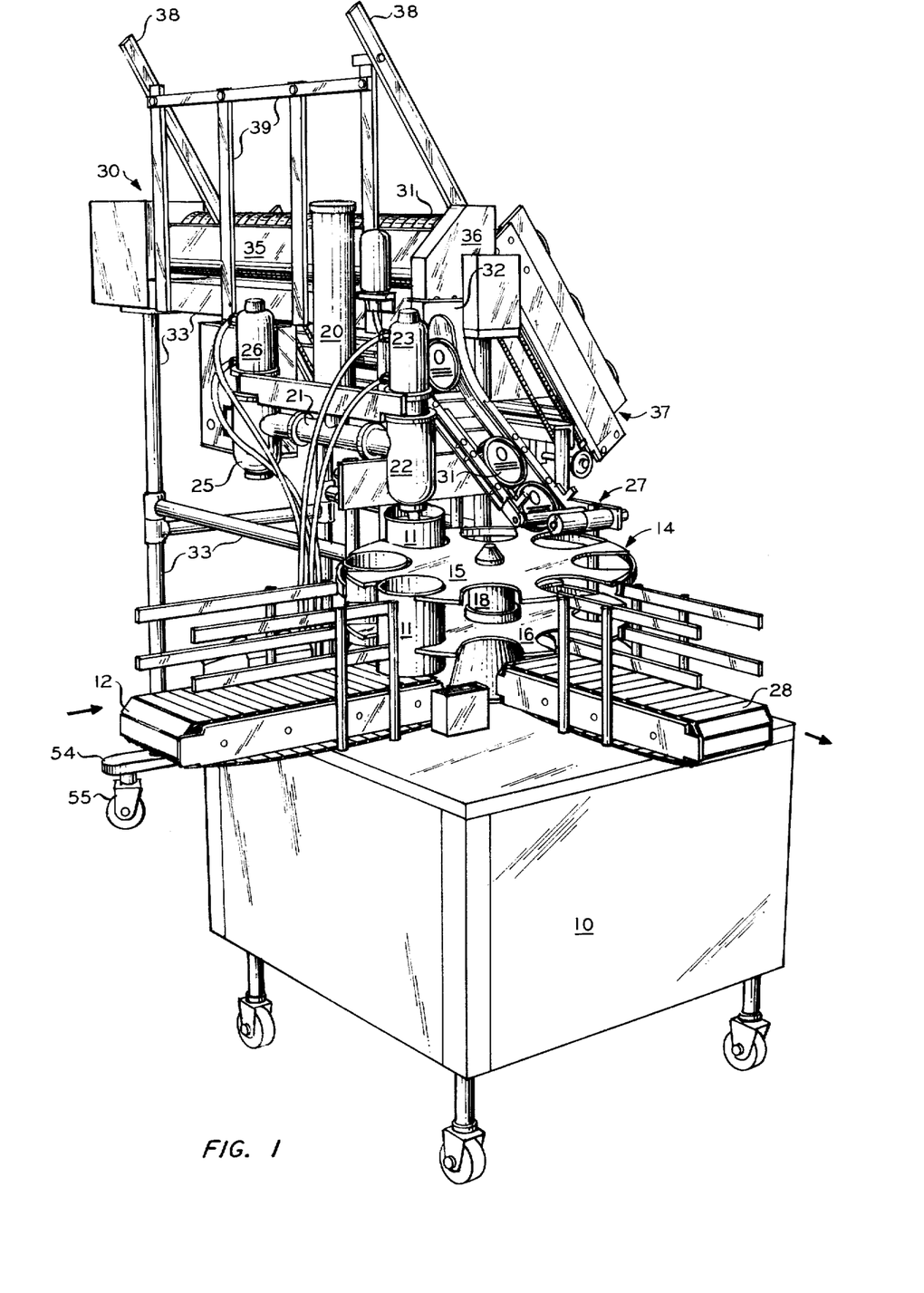
FIG. 1 is a perspective view of an ice cream packaging machine with the apparatus of the invention operably attached thereto.

Referring to FIG. 1, there is illustrated a packaging machine 10 wherein a series of empty containers 11 are delivered by a container conveyor 12 to a packaging conveyor 14. The packaging conveyor 14 comprises an upper plate 15 and a lower plate 16 which are indexed together in a stepwise manner by a drive shaft 18. The upper plate 15 and lower plate 16 of the packaging conveyor 14 are each equipped with conveyor pockets suitable for accepting and engaging a container 11 from the container conveyor 12 and advancing the container 11 to the various stations of the packaging machine. A product supply conduit 20 carries a supply of the material to be packaged, ice cream in this case, to a tee 21 which in turn delivers the product to a flow valve 22. A filler valve actuating means 23 actuates the filler valve 22 during the dwell portion of each cycle to introduce the material to be packaged into the container 11 positioned in the filling station of the conveyor. If desired, a container lift mechanism can be employed to raise the container 11 to be filled so that the outlet end of the filler valve 22 is inside the container and adjacent the botton of the container before the filler valve 22 is actuated. The lift mechanism can then gradually lower the container as it is being filled. A dump valve 25 and dump valve actuating means 26 are provided to direct the material flowing through the product supply conduit to a waste receptacle or other suitable disposal means in the event the packaging conveyor 14 fails to deliver a container 11 to the filling station or if any other condition precludes filling of a container by the packaging machine 10 during the course of its operation. The operation of a packaging machine 10 which, for example, accepts ice cream through its product supply conduit 20 must often operate in conjunction with an ice cream freezing machine which requires continuous removal of the product as it is produced in order to avoid damage to the production equipment. A packaging machine 10 operating at a rate sufficient to accept the product at the rate at which it is being produced must maintain a flow of the product through either filler valve 22 or dump valve 25 except for the time which it takes for the packaging conveyor 14 to be indexed.

A closure feeding mechanism 30 dispenses container closures 31 through an outlet chute 32 to the capping station of the packaging machine 10. At the capping station the capping mechanism 27 affixes a closure to each container. Further indexing of the packaging conveyor 14 deposits the filled and capped container on a delivery conveyor 28 which removes the filled container from the packaging machine 10.

The closure feeding mechanism 30 is supported by a main supporting frame 33 at a height adequate to permit gravity feed of container closures 31 from the outlet chute 32 of the closure feeding mechanism 30 to the capping mechanism 27 of the packaging machine 10. The closure feeding mechanism 30 is equipped with a conveying trough 35 for delivering closures to a dispensing means 36 and the outlet chute 32. A closure magazine 37 is movably mounted on a pair of magazine support tracks 38. The magazine support tracks 38 are in turn supported by a track support subframe 39.

Figure 2:
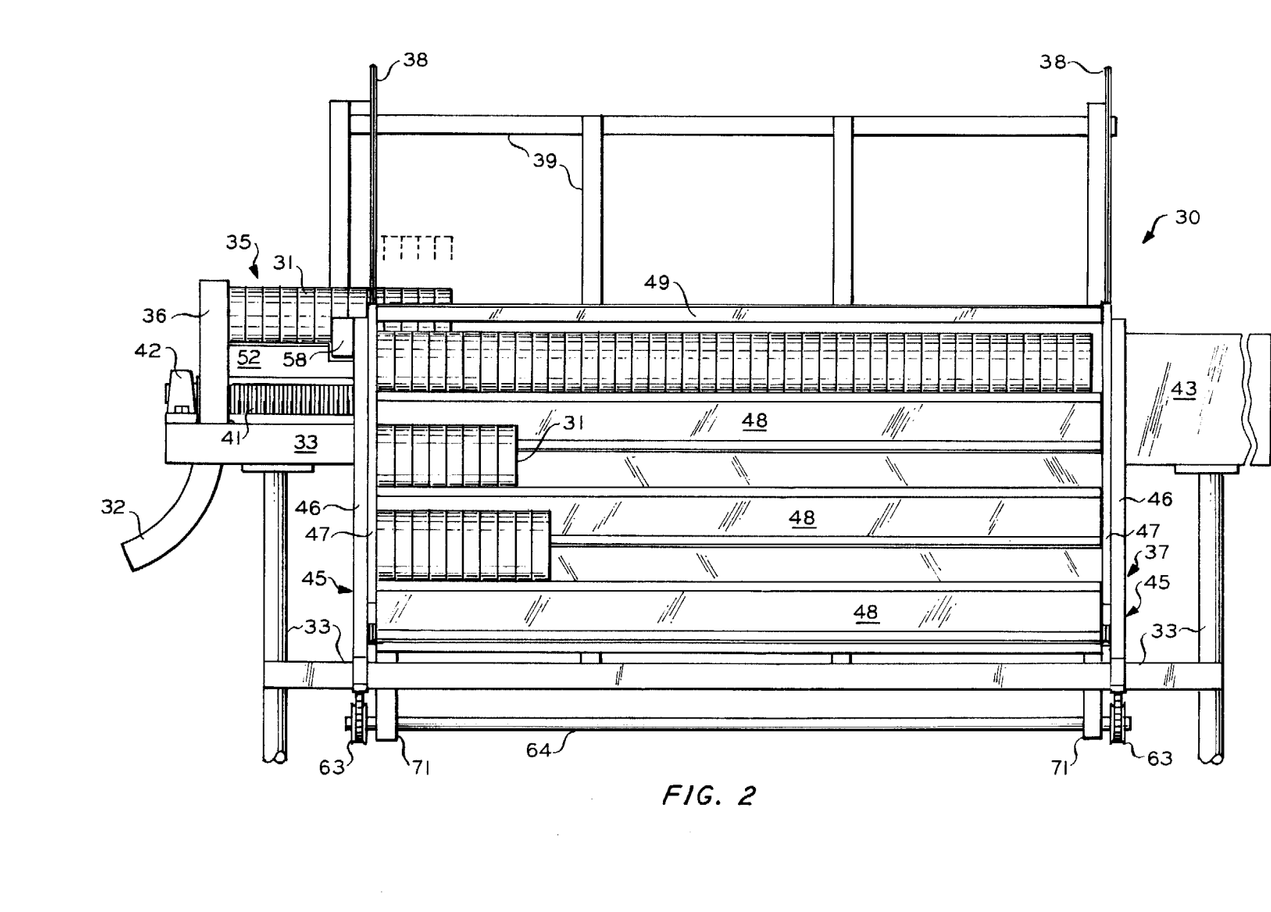
FIG. 2 is a side elevation view of the apparatus of the invention.

The elevation view of the closure feeding mechanism 30, FIG. 2, shows a supply of closures 31 within the conveying trough 35 to be nearing depletion. The closures are carried along the conveying trough 35 toward the dispensing means 36 by a rotating conveyor shaft 41. The supply of closures within the conveying trough 35 is depleted as the dispensing means 36 provides closures to the outlet chute 32 in response to the demand of a packaging machine or other similar device for closures 31. The rotating conveyor shaft 41 is supported by a bearing 42 or other similar suitable supporting means affixed to the main supporting frame and located at either end of the conveyor shaft 41. Although the conveyor shaft can be of any suitable configuration and can be either substantially level or inclined at a suitable angle, the preferred conveyor shaft illustrated is threaded along its entire working length with standard machine threads or, more preferably, with standard machine threads which have had all sharp external surfaces rounded or otherwise removed. The conveyor shaft 41 is rotated by an electric motor or any other standard means of imparting rotational movement to a shaft, including suitable belt and pulley, gear, or other rotational speed altering means located within the motor housing 43. The direction of rotation of the conveyor shaft 41 is such that its external threads will tend to move an article in contact therewith toward the dispensing means 36. The conveyor shaft 41 is preferably continually actuated whenever the closure feeding mechanism 30 is in operation. The speed at which the conveyor shaft 41 is rotated will be dependent upon the pitch of its threads, if any, the angle from horizontal at which it is inclined, the weight and size of closures 31 to be dispensed, and other similar factors. A preferred shaft having a diameter of about 2 inches and threaded along its entire length with double threads at a pitch of about 20 per inch with the threads cut about one-half to about three quarters of normal thread depth and rotating at about 450 to 600 revolutions per minute depending on the diameter of the closure being handled is capable of satisfactorily conveying paperboard closures having a diameter of about 3 to about 7 inches when the shaft is positioned within a range of about ±5° of horizontal. Any rotational speed for the conveyor shaft 41 which is sufficient to maintain the closures 31 on edge and is below the speed at which the force exerted upon the closures by the threaded shaft is sufficient to cause interference with the free operation of the dispensing means 36 is suitable.

Figure 3:
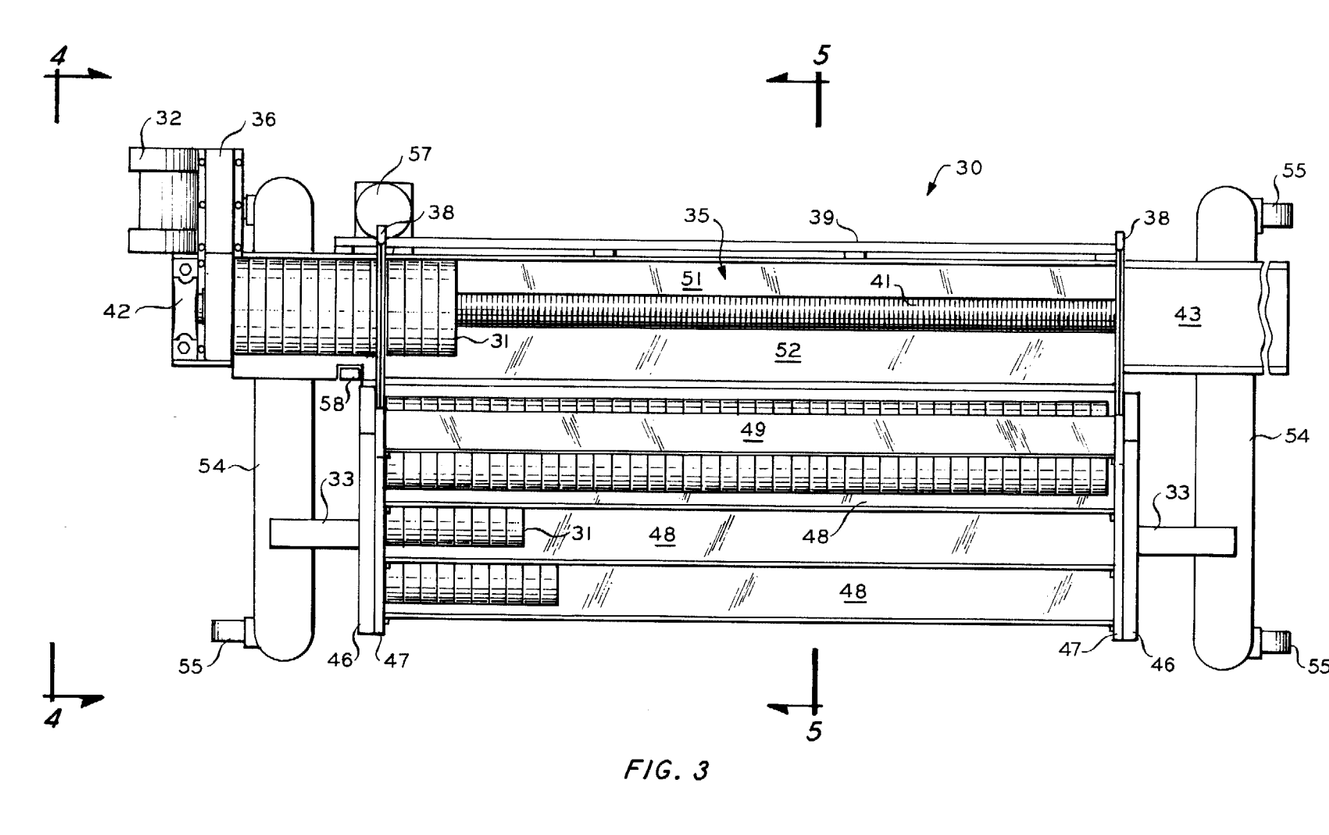
FIG. 3 is a plan view of the apparatus of the invention.

The closure magazine 37 comprises a pair of magazine end members 45, each magazine end member in turn comprising a lower plate 60, a middle plate 46 and an upper plate 47. A plurality of closure support plates 48 and a top plate 49 divide the closure magazine 37 into a plurality of magazine compartments each capable of holding a supply of closures 31 therein. While the preferred embodiment of the invention illustrated is equipped with three closure compartments, use of as few as one such closure compartment or any other number of such compartments is understood to be within the scope of the invention. In FIGS. 2 and 3 the uppermost magazine compartment is shown filled with closures 31 whereas the middle and lower compartments are shown only partially filled in order to more clearly illustrate the structure and operation of the closure magazines 37.

In FIG. 3 the structure of the conveying trough 35 is illustrated with a lower support plate 51 located behind and extending above the conveyor shaft 41 and a front support plate 52 located in front of and extending above the conveyor shaft 41.

Located below the main supporting frame 33 at each end of the closure feeding mechanism 30 is a casters assembly 54 equipped with caster 55 or other similar suitable means for permitting the closure feeding mechanism to be moved from one location to another and to thereby be adaptable for use with different packaging or other closure accepting apparatus. Due to the construction of the conveying trough 35 the closure feeding mechanism 30 is capable of operating at almost any location within most processing or packaging facilities without the need for setting up and leveling each time the apparatus is moved from one location to another.

A photoelectric light source and detector 57, in combination with a suitable reflector 58 such as a mirror or other reflecting means is capable of generating an electric signal or actuating an electric circuit when the supply of closures 31 within the conveying trough 35 is substantially depleted. The photoelectric light source and detector 57 along with a reflector 58 may be positioned at any suitable location along the conveying trough 35 with appropriate modification to the rear support plate 51 and front support plate 52 necessary to permit a beam of light to pass from the light source and detector 57 to the reflector 58 and back whenever the light path is not interrupted by one or more closures 31. Any suitable alternative arrangement of photoelectric detection, such as a system employing a light on one side of the conveying trough 35 and a detector on the opposite side, as well as other means of detecting the depletion of the supply of closures 31 within the conveying trough 35 and generating a signal responsive thereto are within the scope of the invention. The signal generated by the photoelectric apparatus 57 can also be generated responsive to there being room within the conveying trough 35 for another row of closures whether or not the container supply within the conveying trough 35 is depleted.

Figure 4:
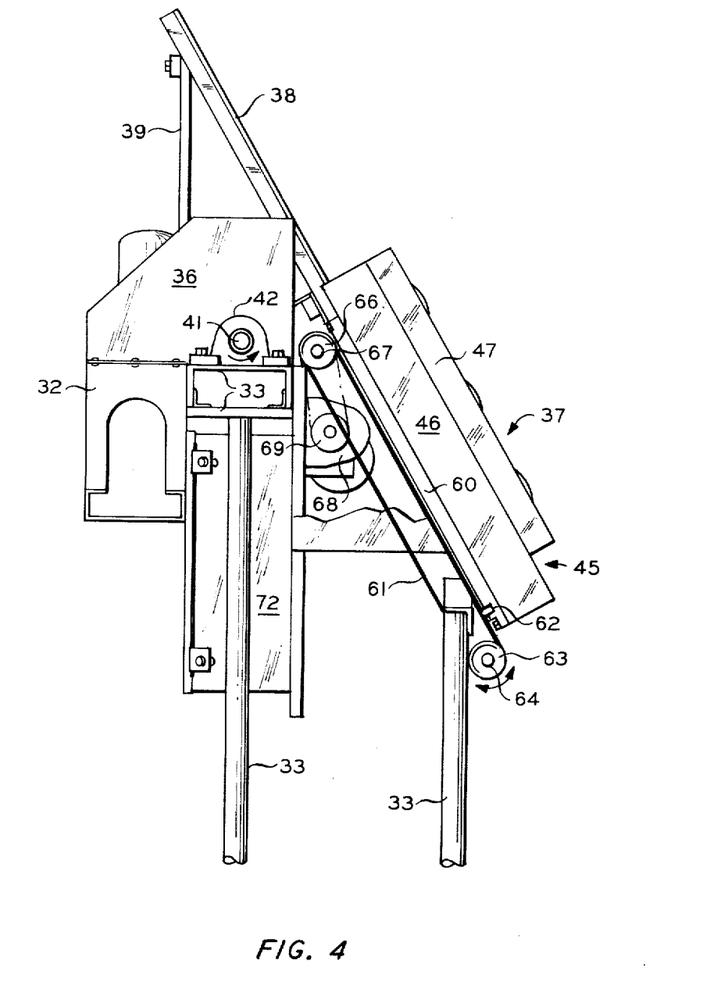
FIG. 4 is an end elevation view of the apparatus of the invention viewed as designated by line 4—4 of FIG. 3.

Referring now to FIG. 4, in the preferred dispensing means 36 illustrated the rotation of the conveyor shaft 41 along with gravitational force urge each successive closure 31 entering the dispensing means 36 to move downwardly toward the outlet chute 32. In this preferred embodiment, the dispensing means 36 comprises only a hollow housing of the shape defined by FIGS. 2, 3, and 4 which is slightly wider than a closure 31. In operation, the outlet chute 32 and a gravitationally operated chute attached thereto will be completely filled by the closure feeding mechanism 30. Thereafter, each time a closure is removed from the chute attached to the outlet chute 32 all closures within the chute system will move down the chute due to the action of gravitational force, and gravitational force and rotation of the conveyor shaft 41 will cause a closure 31 within the dispensing means 36 and contacting the conveyor shaft 41 to be displaced in a direction perpendicular to the longitudinal axis of the conveyor shaft 41 thereby permitting an additional closure 31 to enter the dispensing means 36. Such a dispensing means 36 is simple and maintenance free and has proven to be consistently reliable in the delivery of closures 31 to the outlet chute 32.

Attached to each middle plate 46 of each magazine end member 45 is a lower plate 60 which is in turn attached to and/or engaging a drive chain 61 or other suitable drive means by any suitable means of engagement or attachment such as the illustrated clamp 62 which securely attaches one or more links of the drive chain 61 to the lower plate 60. Alternately, lower plate 60 can be a gear rack driven by a pinion gear on drive shaft 67 instead of the drive chain arrangement illustrated in the drawings. The drive chain 61 is supported at the bottom by a lower sprocket 63 mounted on a shaft 64 and is supported at its upper end and driven by an upper sprocket 66 fixedly attached to a drive shaft 67. An intermittently actuated, reversible magazine drive motor 68 having a sprocket 69 attached to the rotor shaft thereof drives the drive shaft 67 through a chain linking the sprocket 69 with a sprocket attached to the drive shaft 67 and located behind the upper sprocket 66. Actuation of the drive motor 68 therefore results in movement of the entire closure magazine 37 along the magazine support tracks 38. The shaft 64 upon which the lower sprockets 63 are mounted is supported by brackets 71 attached to the main supporting frame 33 (see FIGS. 2 and 5). Any suitable electrical enclosure 72 can be used to house the electrical circuits necessary to control the operation of the drive motor 68. The electrical enclosure 72 is preferably relatively impervious to the entrance of moisture and is preferably placed at a location where it will be least likely to be affected by spraying or washing operations required for proper sanitation in the facility where the closure feeding mechanism is to be used.

Figure 5:
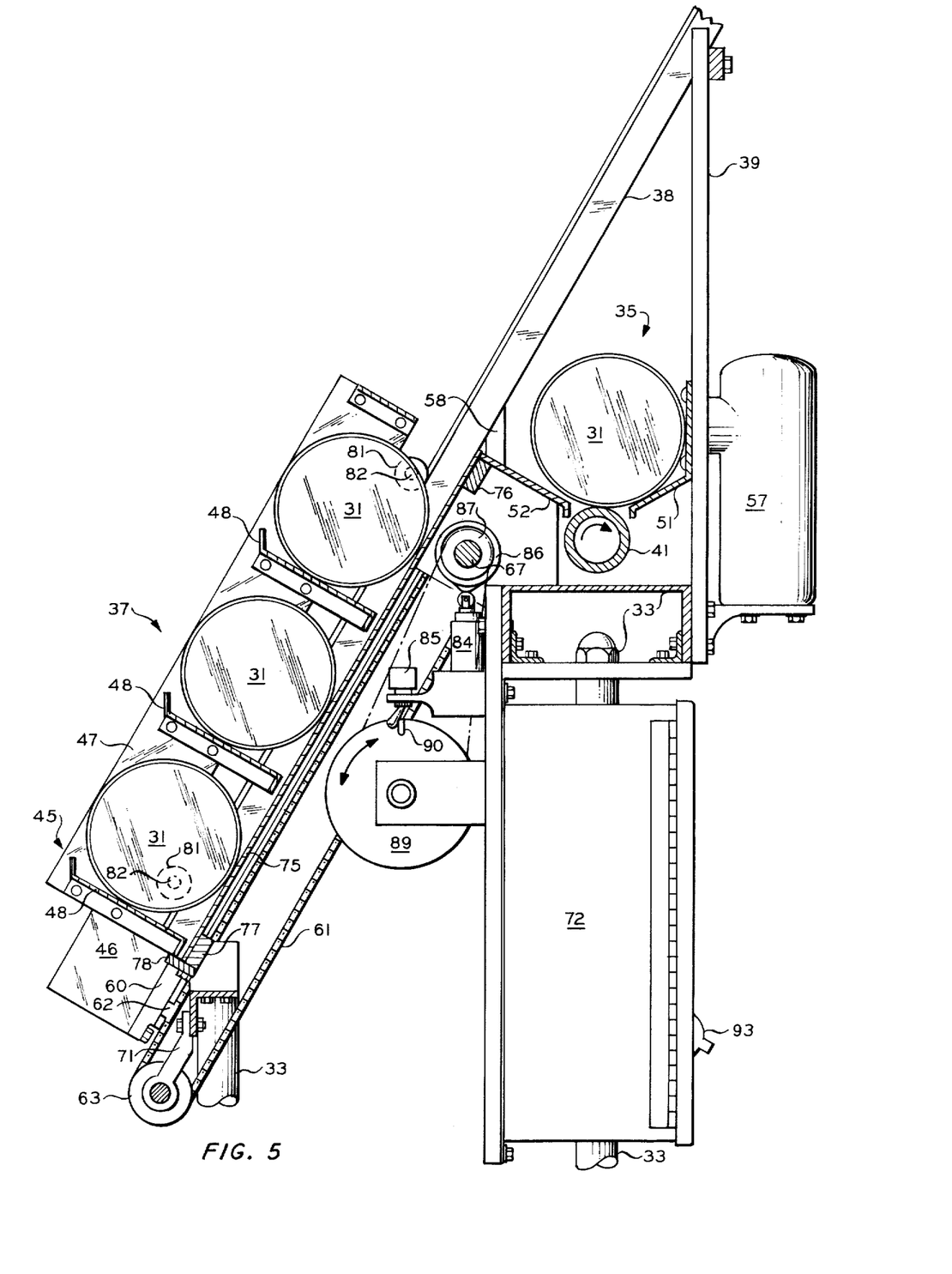
FIG. 5 is the cross sectional view designated by line 5—5 of FIG. 3.

The cross section of FIG. 5 illustrates the manner in which the closure magazine 37 and its associated drive equipment can be utilized to successively replenish the supply of closures 31 within the conveying trough 35. The rear support plate 51 of the conveying trough 35 is attached to the vertical members of the track support subframe 39 which is in turn supported by the main supporting frame 33. The photoelectric light source and detector 57 can be mounted in any suitable manner on the main supporting frame 33, track support subframe 39, or rear support plate 51. A suitable aperture in the rear support plate 51 may be utilized to obtain an unobstructed light path between the photoelectric light source and detector 57 and its associated reflector 58. As illustrated by FIG. 5, a row of closures 31 located within the conveying trough 35 and resting upon the rotating conveyor shaft 41 will obstruct the light path between the photoelectric light source and detector 57 and its associated reflector 58.

Located beneath the closure magazine 37 and rigidly attached to the main supporting frame 33 and the underside of the magazine support track 38 is a backplate assembly comprising a backplate 75 supported by a top backplate support 76, a bottom backplate support 77 and such other supporting members as may be required to maintain the backplate 75 substantially flat and flush with the bottom sides of the magazine support track 38. Attached to the bottom backplate support 77 is a magazine stop plate 78 which establishes the lower limit of travel for the closure magazine 37 by contacting a portion of the lowermost closure support plate 48. The position of the closure magazine 37 illustrated in all of the figures of the drawing is its lowermost position wherein the lowermost closure support plate 48 is in contact with the magazine stop plate 78.

The top edge of the back plate 35 is adjacent the outside edge of the front support plate 52 of the conveying trough 35 to permit a row of closures 31 carried upwardly along the backplate 75 by the closure magazine 37 to roll over the front edge of the front support plate 52 and into the conveying trough 35 when the closure magazine 37 is advanced upwardly along the magazine support tracks 38. A plurality of magazine support rollers 81 rotatably mounted on roller support shafts 82 attached to the middle plates 46 of the magazine end members 45 guide the closure magazine 37 along the magazine support tracks 38. In the embodiment illustrated the magazine support rollers are located directly beneath each upper plate 47 of the magazine end members 45, the outer surface of each magazine support roller 81 is mated to the beveled upper surface of the magazine support tracks 38, and there are two magazine support rollers 81 associated with each magazine end member 45.

Indexing of the closure magazine 37 is controlled by the photoelectric light source and detector 57, a cam operated cycle switch 84 and a reversing switch 85. The cycle switch 84 is actuated by a cam 86 attached to the drive shaft 67. In the embodiment illustrated the diameter of the upper sprocket 66 (FIG. 4) is chosen so that one rotation of the drive shaft 67 will advance the closure magazine 37 a distance equal to the spacing between adjacent closure support plates 48 within the closure magazine 37. The cam 86 therefore has one lobe which actuates the cycle switch 84 at the completion of each advance of the closure magazine 37. An additional sprocket 87 attached to the drive shaft 67 drives an accumulator wheel 89 having an actuating lug 90 attached thereto. The size relationship between the sprocket 87 and the drive sprocket associated with the accumulator wheel 89 is such that the accumulator wheel makes one revolution each time the drive shaft 67 advances the closure magazine 37 a distance equal the distance from its lowermost position to the position at which the containers supported by the lowermost closure support plate 48 within the closure magazine 37 are deposited into the conveying trough 35. In the embodiment illustrated wherein the drive shaft 67 makes one revolution each time the closure magazine 37 is indexed and wherein the closure magazine 37 can be indexed three times before all the closures 31 contained therein are deposited in the conveying trough 35, three revolutions of the drive shaft 67 and the sprocket 87 attached thereto will result in one revolution of the accumulator wheel 89. The actuating lug 90 is affixed to the accumulator wheel 89 so that it contacts the actuating means of a reversing switch 85 each time the accumulator wheel 89 has made one revolution and the closure magazine 37 is in its uppermost or lowermost position.

Figure 6:
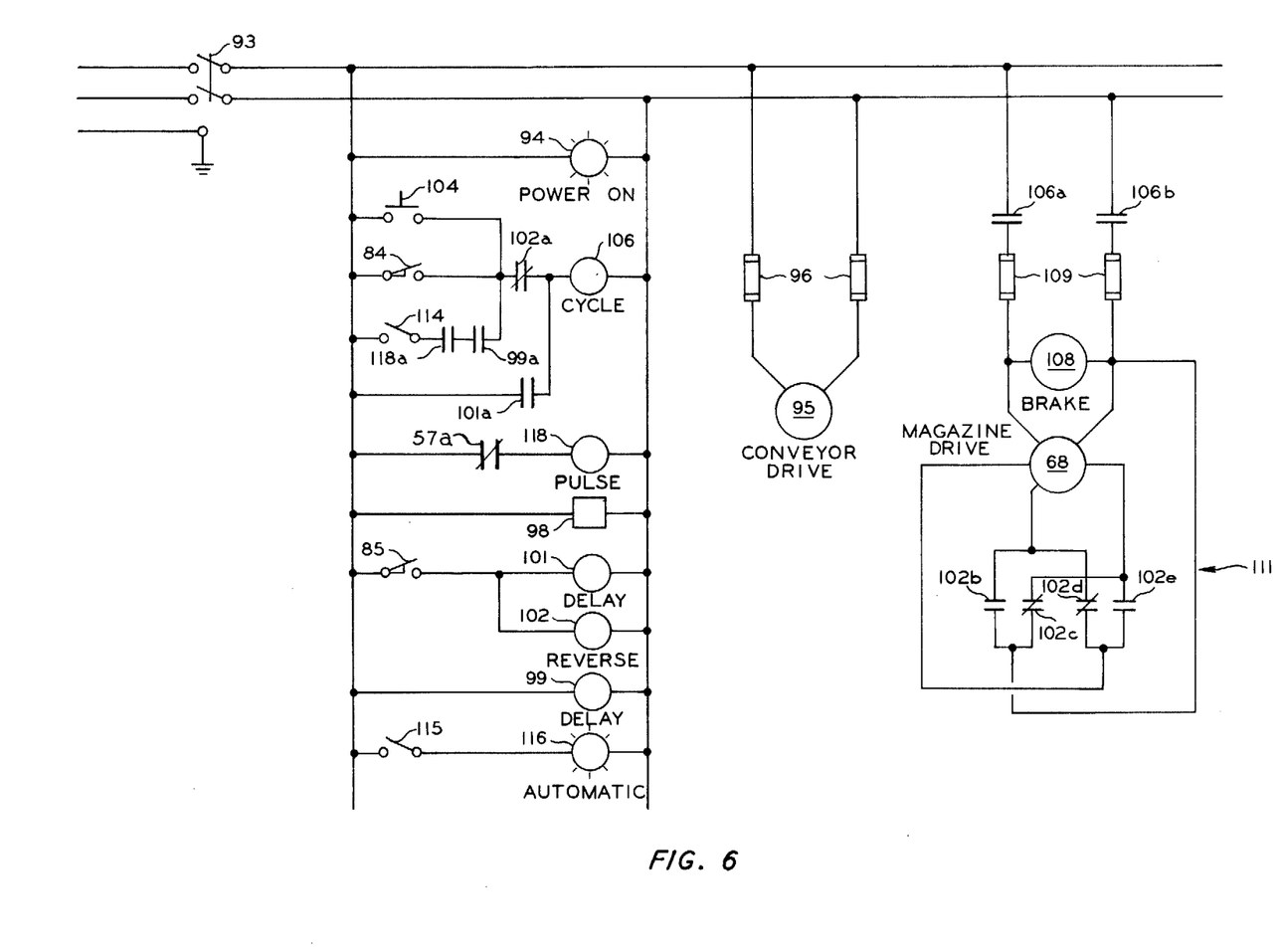
FIG. 6 is a schematic diagram of the electrical control circuits of the invention.

FIG. 6 illustrates the manner in which the photoelectric light source and detector 57, the cycle switch 84, and the reversing switch 85, along with other electrical components, control the movement of the closure magazine 37. A master switch 93 connects all electrical circuits of the closure feeding mechanism 30 to a suitable source of electrical power. In the system described and illustrated by FIG. 6 the electrical power source is a single phase, 60 Hertz alternating current, 115 volt power source of the type ordinarily designated as "household current". Use of other forms of alternating current or direct current or other voltages and using equipment adapted to operate with such other power sources is, of course, possible. When the master switch 93 is closed a power-on pilot light 94 is lighted and the conveyor drive motor 95 begins driving the continuously rotating conveyor shaft 41. Two fuses 96 protect the conveyor drive motor 95 from overload and other similar electrical conditions which might damage the motor. Closing the master switch 93 also supplies power to the photoelectric light source and detector power supply 98. In addition, closure of the master switch 93 supplies power to a time delay coil 99 which, after an appropriate delay, approximately 2 seconds for example, closes its associated normally open contact 99a. As will be more apparent from the following discussion of the remaining circuitry, the action of the time delay coil 99 prevents unwanted or erroneous automatic indexing of the closure magazine 37 during startup of the closure feeding mechanism 30 and while the power supply 98 energizes the photoelectric light source and detector 57 and causes the normally closed contacts 57a to open. After the master switch 93 has been turned on, and the appropriate startup time determined by the time delay coil 99 has elapsed, the pilot light 94 will be lighted, contact 99a will be closed, power will be supplied to the photoelectric light source and detector 57 by its power supply 98, contact 57a will be open, and the conveyor drive motor 95 will be driving the rotating conveyor shaft 41 at its designated speed.

With the power on and the closure magazine 37 being in the position illustrated by FIGS. 2-5 the reversing switch 85 schematically illustrated in FIG. 6 and physically shown in FIG. 5, will be open so that the time delay coil 101 and the reversing coil 102 will be unactuated. The normally open contact 101a associated with the time delay coil 101 will therefore be open and the normally closed contact 102a associated with the reversing coil 102 will be in a closed position. In this condition, manual actuation of the manual cycle switch 104 will apply power to the cycle relay 106, closing the contacts 106a and 106b associated therewith and actuating the magazine drive motor 68. The magazine drive motor 68 has associated therewith a brake releasing means 108 which can be operably connected either electrically or mechanically to the rotor or rotor shaft of the magazine drive motor 68 and which will permit free rotation of the magazine drive motor shaft when contacts 106a and 106b are closed and will electrically or mechanically inhibit rotation of the magazine drive motor shaft when power is not being supplied to the motor 68. Two fuses 109 protect the magazine drive motor 68 and brake releasing mechanism 108 from damage due to overload or other similar electrical conditions. Also associated with the magazine drive motor 68 is a reversing circuit 111.

When the manual cycle switch 104 is depressed and the magazine drive motor 68 begins to index the closure magazine 37 upwardly along the magazine support tracks 38, rotation of the drive shaft 67 and cam 86 attached thereto (FIG. 5) causes the cycle switch 84, which had been held in its open position by the cam 86, to be closed. The closing of the cycle switch 84 insures the continued operation of the magazine drive motor 68, even though the manual cycle switch 104 has automatically reopened after being actuated, until the drive shaft 67 has made one revolution advancing the closure magazine 37 to deposit an additional row of containers within the conveying trough 35 and advancing the cam 86 to reopen the cycle switch 84 thereby stopping the magazine drive motor 68.

If automatic operation of the magazine drive motor 68 is desired, the automatic mode switch 114 can be manually closed. The automatic mode switch 114 is physically connected to or ganged with a pilot light switch 115 for lighting the automatic mode pilot light 116 whenever the automatic mode switch 114 is closed. In this condition, actuation of the photoelectric pulse coil 118 causing its associated contact 118a to close will actuate the magazine drive motor 68 since the contact 99a associated with the time delay coil 99 has already been closed. When the closures 31 in the conveying trough 35 interrupt the light beam of the photoelectric light source and detector 57, a contact 57a associated therewith and operably connected to the photoelectric delay coil 118 is in its open position and prevents actuation of the photoelectric pulse coil 118. Receipt by the photoelectric light source and detector 57 of the light beam reflected from its associated reflector 58 will close contact 57a and will cause power to be applied to the photoelectric pulse coil 118. The contact 118a associated with the photoelectric pulse coil 118 is thereupon closed, thereby actuating the magazine drive motor 68. After a period of time sufficient to permit the magazine drive motor 68 to begin movement thereby closing the cycle switch 84, the photoelectric pulse coil 118 will automatically reopen its associated contact 118a and will not thereafter reclose the contact 118a until it is again triggered by the contact 57a associated with the photoelectric light source and detector 57. The magazine drive motor 68 will therefore continue in operation until the cam 86 reopens the cycle switch 84 when the drive shaft 67 has made one complete rotation.

Although an additional time delay relay can be utilized in conjunction with the operation of the photoelectric light source and detector 57 in order to prevent erroneous indexing of the closure magazine 37 as a result of a momentary separation between adjacent closures 31 located in the conveying trough 35, a preferred method of preventing accidental indexing is positioning of the photoelectric light source and detector 57 and its associated reflector 58 in the manner illustrated by FIG. 3. By offsetting the reflector 58 from the photoelectric light source and detector 57 so that the optical path between the light source 57 and the reflector 58 is not perpendicular to the elongated axis of the conveying trough 35 such accidental indexing is avoided. The distance of the offset between the photoelectric light source and detector 57 and the reflector 58 is preferably equal to the width of at least one closure and more preferably equal to the width of at least two closures. If an additional time delay relay is utilized in lieu of this offset technique, the period of delay prior to actuation of the magazine drive motor 68 would need to be long enough only to prevent momentary separation of the containers 31 within the conveying trough 35 from indexing the closure magazine 37, and the point along the conveying trough 35 at which the photoelectric sensing means 57 is located would need to be moved further away from the dispensing means 36 in order to compensate for the delay time. If desired, a combination of a delay means and offset of the reflector or light source and detector can be used. A preferred system of this type utilizes a photoelectric detector having a built-in fixed or adjustable delay.

Having started in its lowermost position and having been indexed twice, the closure magazine 37 has one remaining row of closures 31 located in the lowermost portion thereof and available for deposit within the conveying trough 35. When the magazine drive motor is actuated, either manually by switch 104 or automatically by the action of the photoelectric light source and detector 57 in closing contacts 51a and 118a, the closure magazine 37 will again be moved upwardly along the magazine support tracks 38. As the closure magazine 37 reaches the upper limit of its travel and cycle switch 84 is opened by cam 86 the accumulator wheel 89 has reached the end of one full revolution and its actuating lug 90 closes the reversing switch 85. As soon as the reversing switch 85 is closed the reversing coil 102 is actuated and its associated contact 102a is opened, thereby preventing operation of the magazine drive motor 68 by the manual cycle switch 104, the cycle switch 84, or contact 118a in conjunction with the automatic mode switch 114. The actuation of the reversing coil 102 also closes its associated contacts 102b and 102e and opens its associated contacts 102c and 102d, thereby altering the manner in which power is supplied to the magazine drive motor 68 and causing it, when actuated, to run in a reverse direction. In addition, closing the reversing switch 85 applies power to the time delay coil 101. After a period of time adequate to permit all closures 31 being delivered to the conveying trough 35 to roll down the front support plate 52 into contact with the conveyor shaft 41 the time delay relay 101 will close its associated contact 101a thereby actuating the cycle relay 106, closing contacts 106a and 106b, and initiating reverse operation of the magazine drive motor 68. Although any suitable time delay for the time delay coil 101 can be used, a period of about 5 seconds has been found to be satisfactory.

As the magazine drive motor 68 operates in its reverse direction the closure magazine 37 is lowered by the drive chains 61 attached to the lower plates 60 on the magazine end members 45. During each rotation of the drive shaft 67 in the reverse direction the cycle switch 84 will be opened and closed by the cam 86 but the operation of the magazine drive motor 68 will not be affected by the cycle switch 84 since the cycle switch has been isolated from the cycle relay 106 by the opening of contact 102a associated with the reversing relay 102. Only after the accumulator wheel 89 has made a full rotation does the actuating lug 90 reopen the reversing switch 85 thereby deenergizing the time delay coil 101 and the reversing coil 102 causing contact 101a to be reopened, contact 102a to be reclosed, and contacts 102b, 102c, 102d and 102e to return to their original positions. Control of the magazine drive motor 68 is thus returned to the manual and automatic cycle mechanisms for operation in the forward direction.

In operation, the closure feeding mechanism 30 is connected at its outlet chute 32 to a gravity chute associated with a machine to which closures 31 are to be supplied. The conveying trough 35 can be either filled with closures or empty. For the purpose of explanation it will be assumed that there are no closures in the conveying trough 35 but that all three compartments of the closure magazine 37 are filled with containers and that the automatic mode switch 114 is closed. When operation of the closure feeding mechanism is desired the master switch 93 is closed by turning the switch to its "on" position and the power on pilot light 94 is lighted. The conveyor drive motor 95 begins rotating the conveyor shaft 41 and the photoelectric light source and detector power supply 98 places the photoelectric light source and power supply 57 in operational condition. As soon as the time delay coil 99 closes its associated contact 99a the closure magazine 37 will be indexed since the absence of closures 31 within the conveying trough 35 will cause contact 57a to close, actuating the photoelectric pulse coil 118 and closing contact 118a. If the conveying trough 35 had contained closures the time delay coil 99 would have prevented unwanted actuation of the magazine drive motor 68 during the brief warmup time required by the photoelectric light source and detector power supply 98. A delay of approximately 2 seconds by the time delay coil 99 is ordinarily sufficient for this purpose for use in conjunction with most modern photoelectric detection systems.

About 2 seconds after the main power switch is turned on, therefore, the closure magazine 37 is indexed and a row of closures is rolled upwardly along the back plate 75 by the upper closure support plate 48 until the upper closure support plate 48 is adjacent the front support plate 52 of the conveying trough 35 and the closures in the first row roll down the front support plate 52 into contact with the rotating conveyor shaft 41 and are conveyed to dispensing means 36 where they are released into the outlet chute 32 as they are required. The closure feeding mechanism can operate unattended from the time it is started up until the time that the supply of closures within the magazine is depleted. With the automatic mode switch 114 closed the closure magazine 37 will be indexed upwardly along the magazine support tracks 38 each time the photoelectric light source and detector 57 senses an absence of closures and generates a signal indicating that the supply of closures within the conveying trough 35 is substantially depleted. After the lowermost row of closures 31 has been rolled upwardly along the back plate 75 and into the conveying trough 35 by the lowermost closure support plate 48 and the closure magazine 37 has reached the upward extent of its travel, the closure magazine 37 will pause for 5 seconds or any other suitable time delay dictated by the time delay coil 101 and will thereafter return to its lowermost position with the lowermost closure support plate 45 resting against the magazine stop plate 78. At this time, either by visual observation or by response to a visual or audio signal generated by return of the closure magazine 37 to its lowermost position, the operator can refill the closure magazine 37 with three more rows of closures before returning to his other duties.

It can be readily seen that use of the closure magazine 37 as a part of the closure feeding mechanism 30 permits the closure feeding mechanism 30 to operate at least three times as long without requiring the attention of someone to replenish its supply of closures. Although the same number of closures will be required over any given period of time, increased efficiency is obtained by making less frequent demands on the operator, thereby lowering the frustrational level of his duty and permitting him longer uninterrupted periods in which he can monitor other equipment, and by permitting more efficient handling of the container closures since they can be prearranged in stacks adapted to fit conveniently into the closure magazine 37 or otherwise adapted for easy reloading of the closure magazine 37.

A row of closures or other generally circular articles within the conveying trough 35 or one of the compartments of the closure magazine 37 as described herein is intended to include any plurality of such articles, usually having a generally annular outer periphery and usually of the same nominal dimension. Each article within the row has a central axis which passes through the center of the circular article and is generally perpendicular to the circular surface of the article or similarly related to an article having only an annular outer surface and not having an actual circular top or bottom surface. A row of such articles is formed by putting a plurality of adjacent articles in generally axial alignment, i.e., placing the articles so that the central axis of each article extends along a common line. Each article within a row may be similarly oriented, with container closures, for example, each having the top facing the same end of the row, or the row may comprise a plurality of axially aligned but otherwise unoriented articles.

While the foregoing description of the invention has been directed primarily toward the preferred embodiment illustrated by the drawings, the invention is not limited thereto. Reasonable variations and modifications are possible within the scope of the foregoing disclosure, the drawing and the appended claims to the invention.

I claim:

1. Apparatus comprising:
    a conveying means for accepting a row of axially aligned articles each having a generally circular outer periphery and delivering said articles to a first end of said conveying means;
    dispensing means located adjacent said first end of said conveying means for receiving each of said articles in said row and delivering each said article from said conveying means;
    a magazine feeder means for delivering at least one axially aligned row of said articles into said conveying means, said magazine feeder means having at least one compartment for carrying a row of said articles to said conveying means and successively releasing each row so carried into said conveying means;
    means for generating a first control signal in response to a substantial depletion of the row of articles within said conveyor means;
    magazine drive means for initiating movement of said magazine feeder means in response to the presence of said first control signal;
    means for terminating operation of said magazine drive means and halting movement of said magazine feeder means in response to a compartment of the magazine feeder means being brought into position to deliver a row of said articles into said conveying means; and
    means for automatically reversing said magazine drive means and returning said magazine feeder means to a preselected reloading position in response to the articles in all compartments thereof having been delivered into said conveying trough means.

2. Apparatus in accordance with claim 1 wherein said means for reversing said magazine drive means and returning said magazine feeder means to a preselected location comprises:
    means for generating a second control signal when all compartments of said magazine feeder means have been brought into position to deliver a row of said articles into said conveying trough means; and
    means responsive to said second control signal for actuating said magazine drive means in a reverse direction to deliver said magazine feeder means to a preselected location at which the plurality of compartments thereof can be refilled with said articles.

3. Apparatus in accordance with claim 1 wherein said means for generating said first control signal comprises:
    photoelectric light source means for projecting a light beam across said conveying means; and
    photoelectric detector means for detecting said light beam and establishing a first control signal responsive to said light beam not being interrupted by one or more of said articles within said conveying means.

4. Apparatus in accordance with claim 1 wherein said conveying means comprises a continuously actuated rotating conveyor shaft extending to the first end of said conveying trough means and positioned within said conveying means so as to contact the edge of each article in a row of such articles located within said conveying means.

5. Apparatus in accordance with claim 4 wherein said conveyor shaft has external threads thereon.

6. Apparatus in accordance with claim 1 wherein said magazine feeder means comprises a pair of magazine end members having a plurality of closure support plates extending between said magazine end members to define a plurality of said compartments, each said magazine end member having attached thereto means for guiding said magazine end member along a magazine support track located below said compartments.

7. Apparatus comprising:

a conveying trough means for accepting a row of axially aligned articles each having a generally circular outer periphery and delivering said articles to a first end of said conveying trough means;

means for continually actuating said conveying trough means during operation of the apparatus;

dispensing means located adjacent said first end of said conveying trough for receiving each of said articles in said row and delivering each said article from said conveying trough; and a magazine feeder means for delivering at least one axially aligned row of said articles into said conveying trough means, said magazine feeder means having a plurality of compartments for carrying a row of said articles to said conveying trough means and successively releasing each said row so carried into said conveying trough means;

means for intermittently automatically indexing said magazine feeder means in response to a substantial depletion of the row of articles within said conveying trough means, said means for automatically indexing said magazine feeder means comprising photoelectric light source means for projecting a light beam across said conveying trough means;

photoelectric detector means for detecting said light beam and establishing a first control signal responsive to said light beam not being interrupted by one or more of said articles within said conveying means;

magazine drive means for initiating movement of said magazine feeder means in response to the presence of said first control signal;

means for terminating operation of said magazine drive means and halting movement of said magazine feeder means in response to a compartment of the magazine feeder means being brought into position to deliver a row of said articles into said conveying trough means; and means for automatically reversing said magazine drive means and returning said magazine feeder means to a preselected reloading position in response to the articles in all compartments thereof having been delivered into said conveying trough means.

8. Apparatus in accordance with claim 7 wherein said means for returning said magazine feeder means to a preselected location comprises:

means for generating a second control signal when all compartments of said magazine feeder means have been brought into position to deliver a row of said articles into said conveying trough means; and means responsive to said second control signal for actuating said magazine drive means in a reverse direction to deliver said magazine feeder means to a preselected location at which the plurality of compartments thereof can be refilled with said articles.

9. Apparatus in accordance with claim 8 wherein said conveying trough means comprises a continuously actuated rotating conveyor shaft extending to the first end of said conveying trough means and positioned within said conveying trough means so as to contact the edge of each article in a row of such articles located within said conveying trough means.

10. Apparatus in accordance with claim 9 wherein said conveyor shaft has external threads thereon.

11. A method of dispensing articles each having a generally circular outer periphery, said method comprising:

dispensing said articles from an axially aligned row of said articles located within a conveying means;

storing at least one additional row of said articles in a feeding magazine means adjacent said conveying means;

establishing a first control signal in response to a substantial depletion of the row of articles within said conveying means;

actuating a magazine drive means to advance said feeding magazine in response to said first control signal;

automatically terminating operation of said magazine drive means upon advancement of said feeding magazine a distance sufficient to permit deposit of a said additional row of said articles within said conveying means; and automatically reversing said magazine drive means to return said feeding magazine to a preselected reloading location after all said additional rows of articles contained therein have been delivered to said conveying trough means.

12. A method in accordance with claim 11 wherein establishing said first control signal comprises:

photoelectrically sensing a depletion of the row of articles within said conveying trough means sufficient to permit accommodation of said one of said additional rows within said conveying trough means; and generating a first control signal in response to said photoelectric sensing.

13. A method in accordance with claim 11 wherein dispensing said articles comprises:

contacting each said article of the row within said conveying means with a continuously rotating shaft to impart a rotational movement to each said article;

advancing each said article along said continuously rotating shaft to a first end of said conveying means; and removing one article at a time from said conveying means at said first end thereof.

14. A method in accordance with claim 13 wherein advancing each said article along said continuously rotating shaft comprises rotating said shaft in a direction which causes a threaded outside surface thereof to apply a force on each said article in contact therewith, said force having at least one component in the direction of said first end of said conveyor trough means.

15. A method of dispensing articles each having a generally circular outer periphery, said method comprising:

dispensing said articles from an axially aligned row of said articles located within a conveying trough means;

storing a plurality of additional rows of said articles in a feeding magazine means adjacent said conveying trough means;

automatically advancing one of said at least one additional rows into said conveying trough means in response to a substantial depletion of the row of said articles located within said conveying trough means by photoelectrically sensing a depletion of the row of articles within said conveying trough means sufficient to permit accommodation of said one of said additional rows within said conveying trough means;

generating a first control signal in response to said photoelectric sensing, actuating a magazine drive motor to advance said feeding magazine in response to said first control signal;

automatically terminating operation of said magazine drive motor upon advancement of said feeding magazine a distance sufficient to permit deposit of said one of said additional rows within said conveying trough means; and automatically reversing said magazine drive means to return said feeding magazine to a preselected reloading location after all said additional rows of articles contained therein have been delivered to said conveying trough means.

16. A method in accordance with claim 15 wherein dispensing said articles comprises:

contacting each said article of the row within said conveying trough means with a continuously rotating shaft to impart a rotational movement to each said article;

advancing each said article along said continuously rotating shaft to a first end of said conveying trough means; and removing one article at a time from said conveying trough means at said first end thereof.

17. A method in accordance with claim 16 wherein advancing each said article along said continuously rotating shaft comprises rotating said shaft in a direction which causes a threaded outside surface thereof to apply a force on each said article in contact therewith, said force having at least one component in the direction of said first end of said conveyor trough means.

* * * * *